US011513183B2

(12) United States Patent
Cho

(10) Patent No.: US 11,513,183 B2
(45) Date of Patent: Nov. 29, 2022

(54) METHOD AND APPARATUS FOR OBTAINING ANGLE INFORMATION OF REFERENCE SIGNAL

(71) Applicant: Locaila, Inc, San Jose, CA (US)

(72) Inventor: Jaihyung Cho, Daejeon (KR)

(73) Assignee: Locaila, Inc, San Jose, CA (US)

( * ) Notice: Subject to any disclaimer, the term of this patent is extended or adjusted under 35 U.S.C. 154(b) by 0 days.

(21) Appl. No.: 17/192,908

(22) Filed: Mar. 5, 2021

(65) Prior Publication Data
US 2022/0283257 A1 Sep. 8, 2022

(51) Int. Cl.
*H04L 5/00* (2006.01)
*G01S 3/46* (2006.01)
*H04B 7/06* (2006.01)

(52) U.S. Cl.
CPC .............. *G01S 3/46* (2013.01); *H04B 7/0695* (2013.01); *H04L 5/0048* (2013.01)

(58) Field of Classification Search
CPC ........ G01S 3/46; H04B 7/0695; H04L 5/0048
See application file for complete search history.

(56) References Cited

U.S. PATENT DOCUMENTS

| 10,681,668 | B2* | 6/2020 | Haatsen | G01S 11/02 |
| 10,700,901 | B1* | 6/2020 | Torrini | H04L 27/0014 |
| 2017/0131380 | A1 | 5/2017 | Malik et al. | |
| 2017/0212204 | A1* | 7/2017 | Amizur | G01S 3/48 |
| 2019/0116605 | A1* | 4/2019 | Luo | H04B 7/088 |
| 2022/0014935 | A1* | 1/2022 | Haija | H04W 16/28 |

* cited by examiner

*Primary Examiner* — Kenneth T Lam
(74) *Attorney, Agent, or Firm* — Nicholas Park

(57) ABSTRACT

Provided is a method of acquiring angle information of a reference signal performed by a user equipment (UE), the method including receiving a reference signal from a base station including a plurality of patch antennas; acquiring phase information depending on a carrier frequency of the reference signal based on received data of the reference signal measured at a plurality of sample times; and calculating an angle of departure (AoD) of the reference signal based on the phase information depending on the carrier frequency.

14 Claims, 8 Drawing Sheets

METHOD AND APPARATUS FOR OBTAINING ANGLE INFORMATION OF REFERENCE SIGNAL

BACKGROUND

1. Field

The present disclosure of the following description relates to a method and apparatus for acquiring angle information of a reference signal received at a user equipment (UE), and more particularly, to a method and apparatus for determining a scanning direction of a beam transmitted to a UE based on angle information of a reference signal.

2. Related Art

A communication system may include a core network, for example, a mobility management entity (MME), a serving gateway (SGW), a packet data network (PDN) gateway (PGW), a base station (e.g., a macro base station, a small base station, and a relay), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

As a frequency band used for wireless communication becomes higher in a gradual manner, pathloss of radio wave increases, which may lead to reducing cell coverage. To solve the aforementioned issue, a 5G mobile communication standard divides the cell coverage into a plurality of sections corresponding to an analog beam width, sequentially transmits a beam corresponding to each section, and covers the cell coverage.

A base station employs a beam sweeping method to select an optimal beam to be transmitted to a UE. However, if a position of the UE varies, a beam sweeping procedure needs to be performed again to determining direction of a beam for the UE. Therefore, wireless resources may be redundantly used.

SUMMARY

At least one example embodiment provides a method and apparatus for acquiring angle information of a signal received at a user equipment (UE) from a base station.

At least one example embodiment also provides a method and apparatus for determining a scanning direction of a beam for a UE based on angle information of a signal received at the UE from a base station.

According to an aspect, there is provided a method of acquiring angle information of a reference signal performed by a UE, the method including receiving a reference signal from a base station including a plurality of patch antennas; acquiring phase information depending on a carrier frequency of the reference signal based on received data of the reference signal measured at a plurality of sample times; and calculating an angle of departure (AoD) of the reference signal based on the phase information depending on the carrier frequency.

The plurality of patch antennas may include a first patch antenna configured to transmit a first subcarrier and a second patch antenna configured to transmit a second subcarrier different from the first subcarrier.

The phase information may depend on a sum of the carrier frequency and a difference between the first subcarrier and the second subcarrier.

A waveform of the reference signal may be configured to be continuous in a time interval greater than a size of an orthogonal frequency division multiplexing (OFDM) symbol.

The plurality of patch antennas may be configured to transmit subcarriers included in a predetermined subcarrier group and the subcarriers may be provided at equal intervals in a frequency domain.

The acquiring of the phase information may include acquiring a sample vector based on the received data of the reference signal; calculating a phase vector by performing an inner product on a discrete Fourier transform (DFT) coefficient vector for a DFT operation with respect to the sample vector; extracting a first sub-phase vector and a second sub-phase vector from the phase vector; and extracting the phase information from a conjugate product from the first sub-phase vector and the second sub-phase vector.

The conjugate product of the first sub-phase vector and the second sub-phase vector may include a conjugate product between a first component of the phase vector and a second component having an angular frequency index different from an angular frequency of the first component.

The conjugate product of the first sub-phase vector and the second sub-phase vector may be independent from a local clock error between the UE and the base station.

According to another aspect, there is provided a UE including a communicator; and a processor. The processor is configured to perform a process of receiving a reference signal from a base station including a plurality of patch antennas, a process of acquiring phase information depending on a carrier frequency of the reference signal based on received data of the reference signal measured at a plurality of sample times, and a process of calculating an AoD of the reference signal based on the phase information depending on the carrier frequency.

According to still another aspect, there is provided a beam selection method performed by a base station, the beam selection method including setting a subcarrier group allocated to a plurality of patch antennas; determining a reference signal sequence; transmitting a reference signal based on the subcarrier group and the reference signal sequence; acquiring information about an AoD of the reference signal from a UE; and determining a beam to be transmitted to the UE based on information about the AoD of the reference signal.

The plurality of patch antennas may include a first patch antenna configured to transmit a first subcarrier and a second patch antenna configured to transmit a second subcarrier different from the first subcarrier.

The reference signal sequence may be configured such that a waveform of the reference signal is configured to be continuous in a time interval greater than a size of an OFDM symbol.

Subcarriers included in the subcarrier group may be provided at equal intervals in a frequency domain.

According to at least one example embodiment, a UE may easily calculate a difference in travel distance or a difference in propagation delay time between signals received from different patch antennas.

According to at least one example embodiment, a UE may easily calculate an AoD of a reference signal from phase information corresponding to a difference in travel distance or a difference in propagation delay time between signals received from different patch antenna.

According to at least one example embodiment, a base station may omit a beam sweeping procedure based on information about an AoD of a reference signal, thereby preventing the redundant use of wireless resources.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

DETAILED DESCRIPTION

Figure 1:
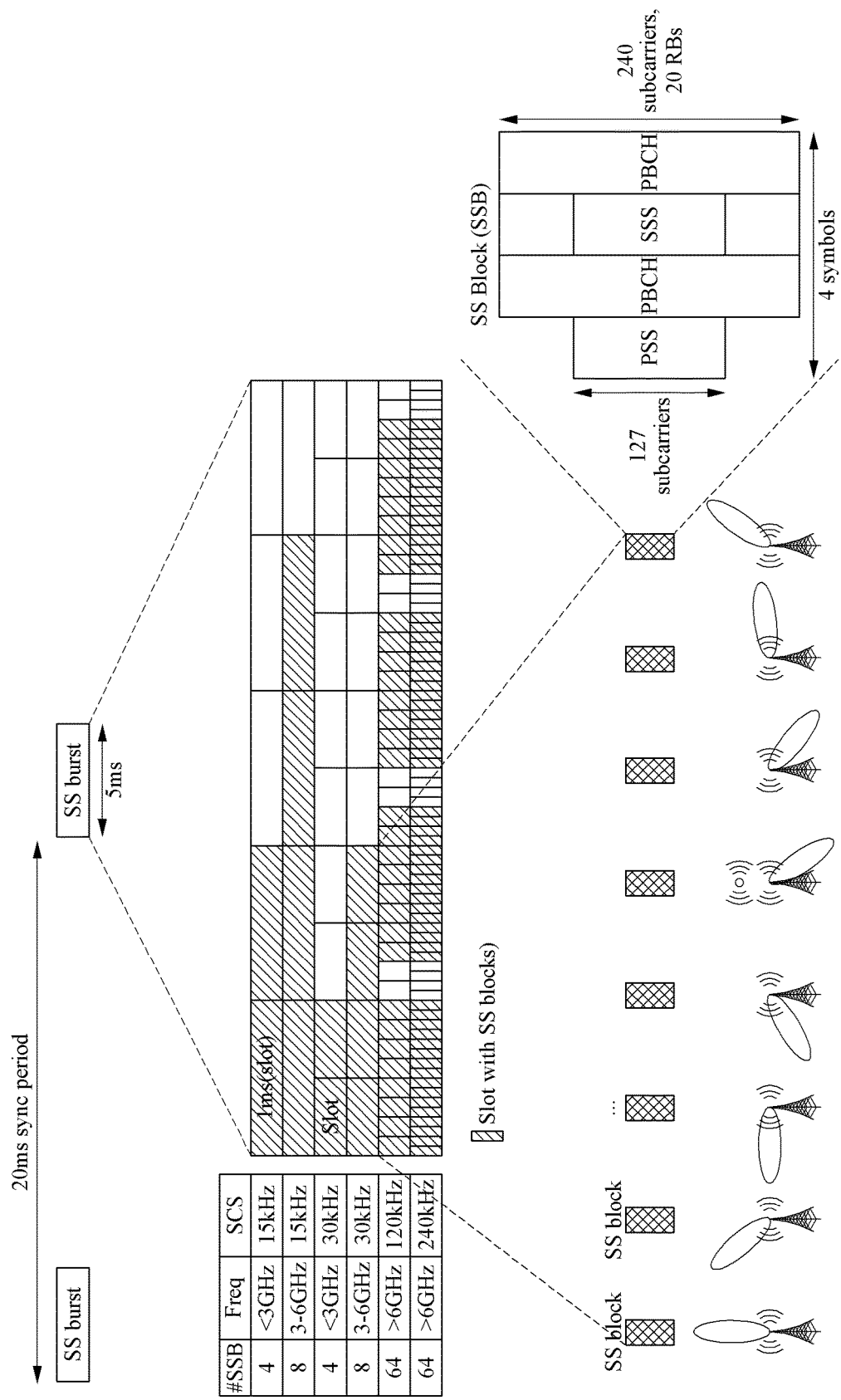
FIG. 1 illustrates an example of a beam sweeping procedure according to at least one example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first," "second," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "coupled to" another component, the component may be directly connected to or coupled to the other component, or one or more other intervening components may be present.

In contrast, when a component is referred to as being "directly connected to" or "directly coupled to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

FIG. 1 illustrates an example of a beam sweeping procedure according to at least one example embodiment.

Referring to FIG. 1, a base station may cover cell coverage by sequentially scanning beams in different directions. The base station may sequentially transmit a Physical Broadcast Channel (PBCH) to a symbol group of a synchronization signal block (SSB). The base station may map each SSB in a different spatial direction. That is, the bae station may map each SSB in a direction in which each beam is scanned.

A user equipment (UE) may receive a beam from the base station. The UE may sense an SSB corresponding to a beam having a strongest received strength. The UE may decode the SSB of the beam having the strongest received strength and may transmit decoding information to the base station. The base station may operate UE-specific coverage by selecting an optimal beam for the UE based on information received from the UE and by communicating with the UE.

However, if a position of the UE is not fixed, the base station may need to re-update the optimal beam for the UE. In this case, the base station may need to repeat a beam sweeping procedure. As the beam sweeping procedure is repeated, an amount of wireless resources being used may increase. If the base station omits such beam sweeping and determines a beam transmission direction for the UE, an amount of wireless resources used by beam sweeping may decrease.

Figure 2:
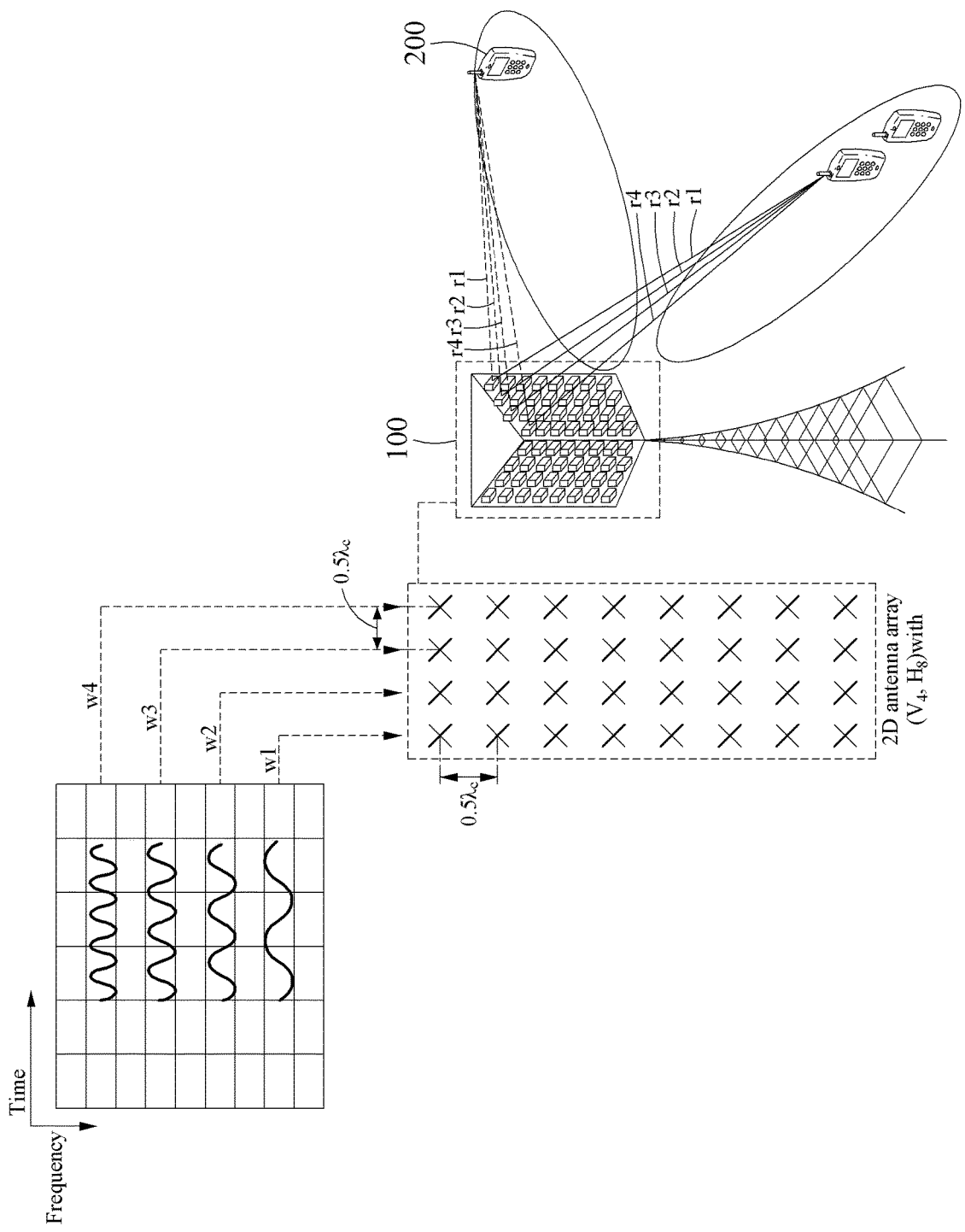
FIG. 2 illustrates an example of a wireless communication system according to at least one example embodiment.

FIG. 2 illustrates an example of a wireless communication system according to at least one example embodiment.

Referring to FIG. 2, the wireless communication system may include a base station 100 and a UE 200. The base station 100 may also be referred to as a node base (NodeB), a next generation NodeB, an evolved NodeB, gnodeB, a base transceiver station (BTS), a radio base station, a radio transceiver, an access point, an access node, a road side unit (RSU), a radio remote head (RRH), a transmission point (TP), a transmission and reception point (TRP), a relay node, and the like. The UE 200 may also be referred to as a terminal, an access terminal, a mobile terminal, a station, a subscriber station, a mobile station, a portable subscriber station, a node, a device, and the like.

The base station 100 may include antenna elements arranged on a two-dimensional (2D) flat panel and the antenna elements may constitute a patch antenna. In the case of a 5G wireless communication system, the base station 100 may include 64 antenna elements. The antenna elements may constitute a patch antenna. For example, referring to FIG. 2, 1×2 antenna elements may constitute a single patch antenna. Therefore, 8×4 patch antennas may be arranged on the flat panel. The aforementioned numerical values are provided as examples only to help understanding and the example embodiments are not limited thereto.

An interval between patch antennas may be set to 0.5 times of a wavelength ($\lambda_c$) of carrier frequency. The base station 100 may allocate a different subcarrier for each patch antenna on the flat panel. For example, patch antennas present in a first column may transmit a reference signal using a first subcarrier and patch antennas present in a second column may transmit the reference signal using a second subcarrier. However, it is provided as an example only. For example, the base station 100 may allocate a different subcarrier for each row present in which patch antennas are present on the flat panel. As another example, the base station 100 may allocate a specific subcarrier to patch antennas included in a specific area or a plurality of areas on the flat panel.

The base station 100 may allocate a reference symbol for transmitting a reference signal to each of patch antennas. For example, patch antennas present in the first column may transmit the reference signal using a first reference symbol, patch antennas present in the second column may transmit the reference signal using a second reference symbol. However, it is provided as an example only. A method of allocating, by the base station 100, a reference symbol to each of patch antennas may be variously modified, such as the aforementioned subcarrier allocation method.

Figure 3:
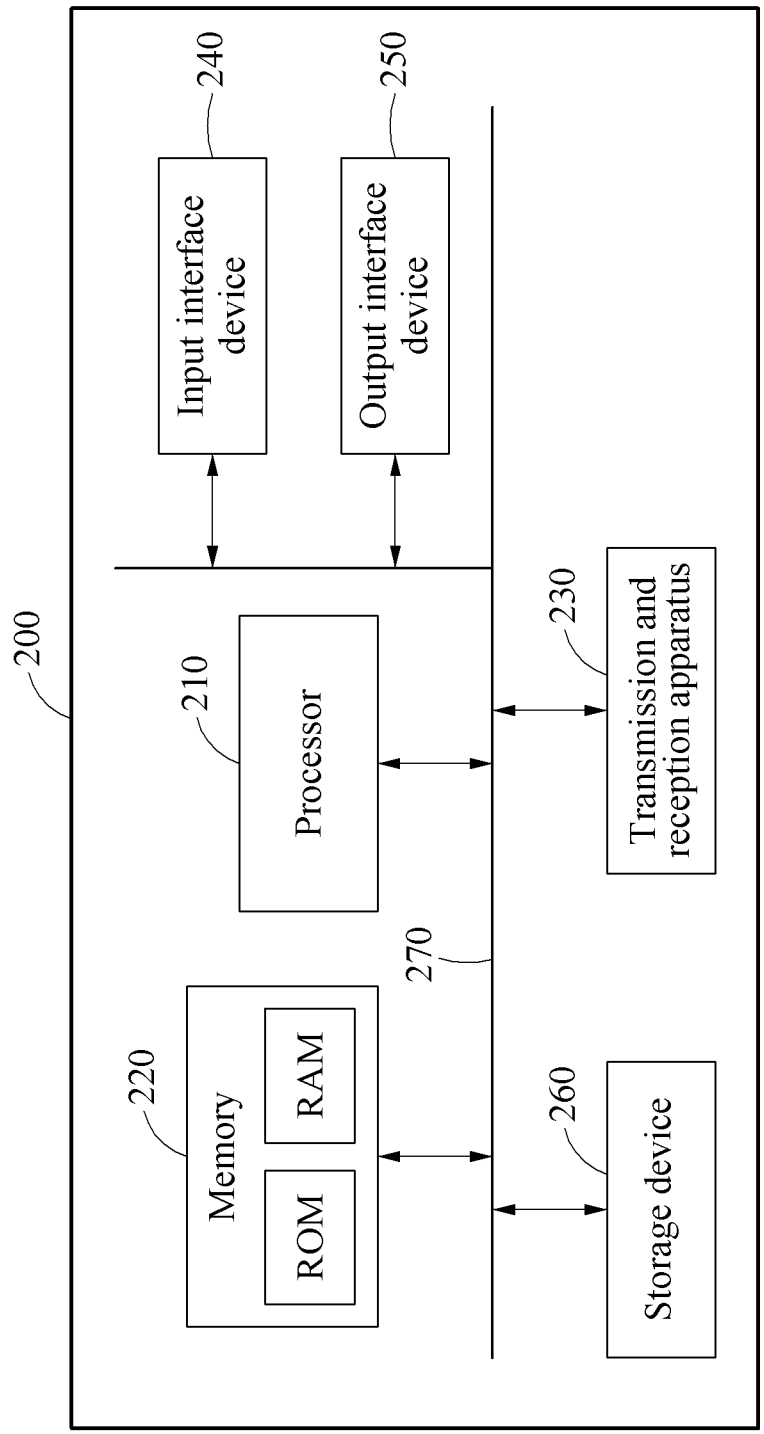
FIG. 3 is a diagram illustrating an example of a configuration of a communication node included in a communication system according to at least one example embodiment.

FIG. 3 is a diagram illustrating an example of a configuration of a communication node included in a communication system according to at least one example embodiment. Reference numeral "200" used for the UE of FIG. 2 is also used to represent the communication node of FIG. 3. A configuration of FIG. 3 may also apply to the base station 100.

Referring to FIG. 3, the communication node 200 may include at least one processor 210, a memory 220, and a transmission and reception apparatus 230 configured to perform communication through connection to a network. Also, the communication node 200 may further include an input interface device 240, an output interface device 250, and a storage device 260. The components included in the communication node 200 may communicate with each other through connection to a bus.

The processor 210 may execute a program command stored in at least one of the memory 220 and the storage device 260. The processor 210 may refer to a central processing unit (CPU), a graphics processing unit (GPU), or an exclusive processor that performs methods according to example embodiments. Each of the memory 220 and the storage device 260 may be configured as at least one of a volatile storage medium and a nonvolatile storage medium. For example, the memory 220 may be configured as at least one of read only memory (ROM) and random access memory (RAM).

Figure 4:
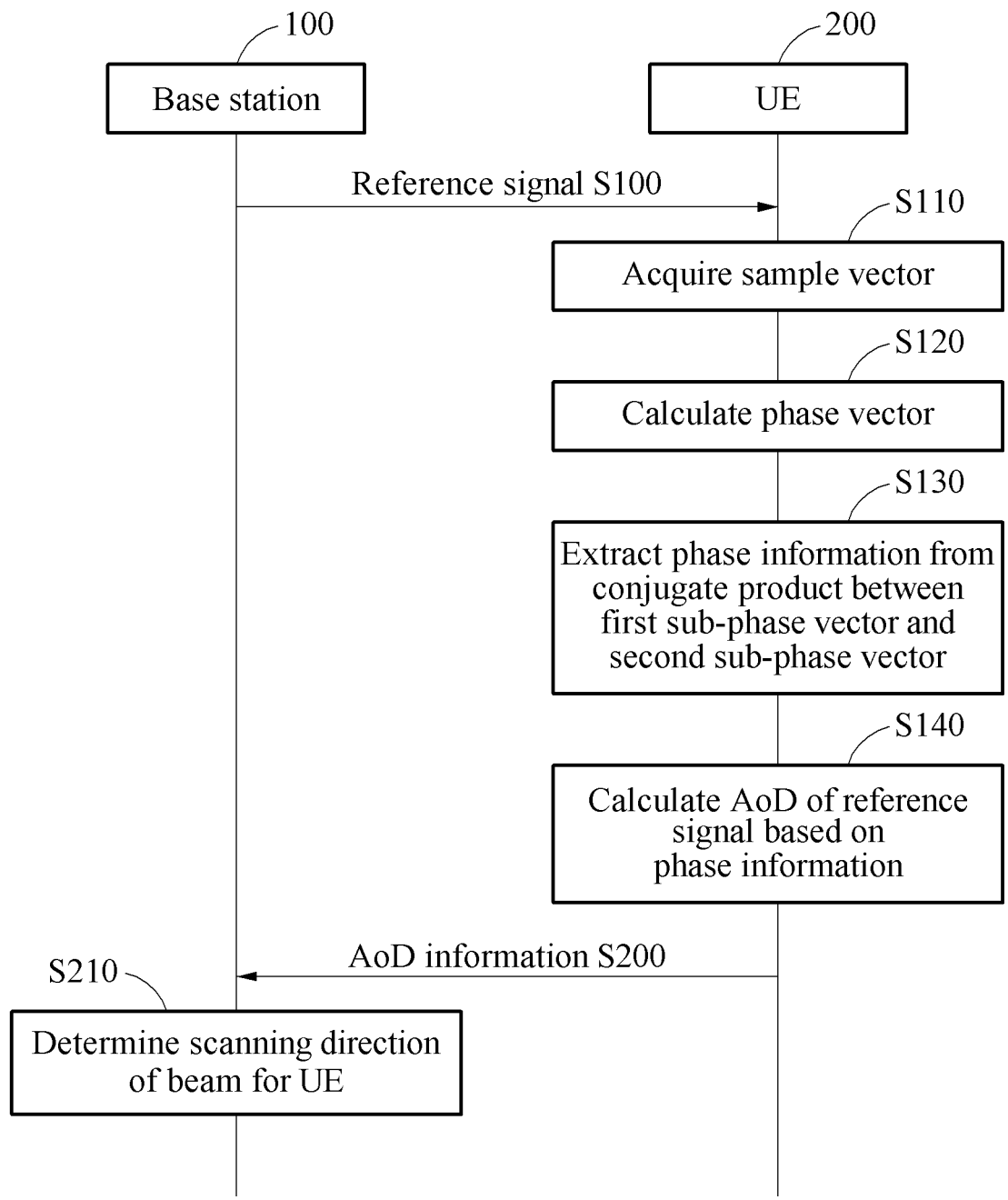
FIG. 4 is a flowchart illustrating a method of acquiring angle information of a reference signal according to at least one example embodiment.

FIG. 4 is a flowchart illustrating a method of acquiring angle information of a reference signal according to at least one example embodiment.

Referring to FIG. 4, in operation S100, the base station 100 may transmit a reference signal. The base station 100 may transmit the reference signal of a waveform that is continuous in a time interval greater than a symbol period. If the reference signal has a continuous waveform in the time interval greater than the symbol period, the UE 200 may easily receive the reference signal and extract a sample vector.

Figure 5:
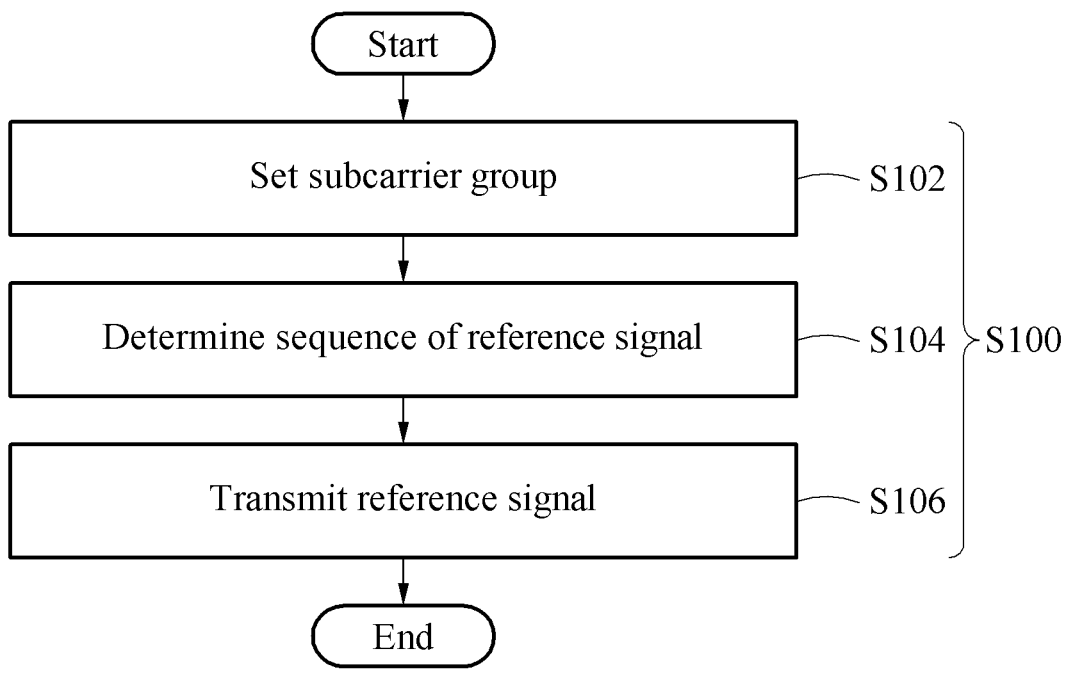
FIG. 5 is a flowchart illustrating an example of a process of performing operation S100 of FIG. 4 according to at least one example embodiment.

FIG. 5 is a flowchart illustrating an example of a process of performing operation S100 of FIG. 4 according to at least one example embodiment.

Referring to FIG. 5, in operation S102, the base station 100 may set a group of subcarriers, that is, a subcarrier group, to be allocated to patch antennas. The subcarriers included in the subcarrier group may be provided at equal intervals in a frequency domain. Indices of the subcarriers included in the subcarrier group may continuously increase. As another example, indices of the subcarriers included in the subcarrier group may satisfy an arithmetical progression that increases based on a predetermined size.

When the subcarriers included in the subcarrier group are separated from each other at equal intervals in the frequency domain, the following process of calculating a conjugate product between phase vectors and extracting phase information of the conjugate product may be easily performed.

In operation S104, the base station 100 may determine a sequence of the reference signal. The base station 100 may determine the sequence of the reference signal such that the reference signal may have a continuous waveform in the boundary between the symbols. In operation S106, the base station 100 may transmit the reference signal generated using the sequence of the reference signal.

Hereinafter, a sequence of a reference signal such that the reference signal may be continuous in a boundary between symbols is described.

Figure 6:
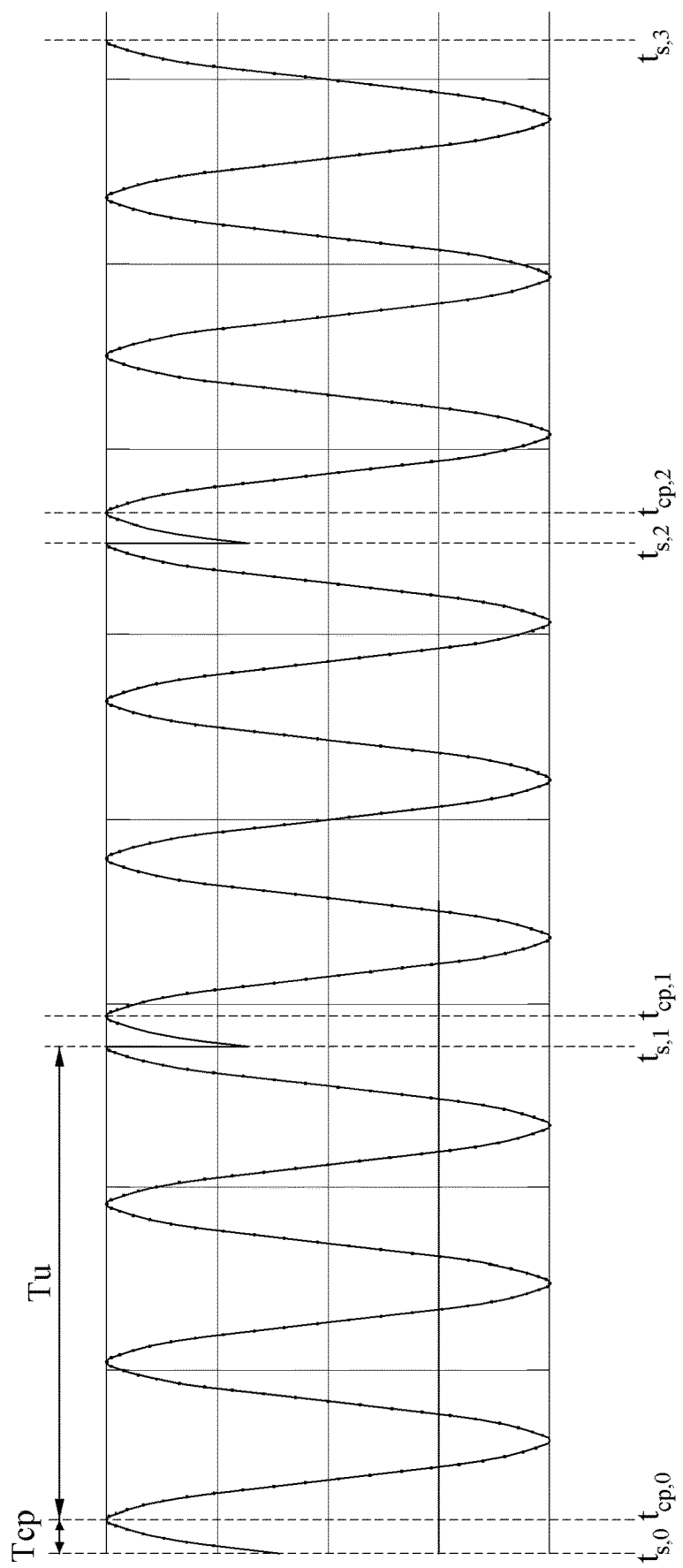
FIG. 6 illustrates an example of a waveform of a reference signal in the case of generating the reference signal using a sequence for generating a general sine wave according to at least one example embodiment.

FIG. 6 illustrates an example of a waveform of a reference signal in the case of generating the reference signal using a sequence for generating a general sine wave according to at least one example embodiment.

Referring to FIG. 6, due to presence of a cyclic prefix (CP) duration, the waveform of the reference signal may be discontinuous in a boundary between symbols. Therefore, the base station 100 may shift a sequence phase of the reference signal such that the waveform of the reference signal may be continuous in the boundary between the symbols.

For example, the base station 100 may generate the reference signal using a sequence of Equation 1.

$$X_\ell[k] = X_{\ell-1}[k] \cdot \exp\left(2\pi jk \cdot \frac{T_{CP,\ell-1}}{T_u}\right) \quad \text{[Equation 1]}$$

In Equation 1, $X\ell[k]$ denotes a frequency domain complex exponentiation representing an initial phase and amplitude of a k-th subcarrier of an $\ell$-th symbol, $T_u$ denotes a length of a valid period of a symbol, and $T_{CP,\ell-1}$ denotes a length of a cyclic prefix (CP) duration of an ($\ell$-1)-th symbol. Here, $\ell$ denotes a natural number. In the LTE standard, an index of a symbol may be counted for each slot. If a normal CP is used in the LTE standard, $\ell=1, 2, \ldots 6$. If an extended CP is used in the LTE standard, $\ell=1, 2, \ldots 5$. In the 5G NR standard, an index of a symbol may continuously increase in a time domain. Accordingly, in a 5G NR standard, ℓ may be a random natural number.

Figure 7:
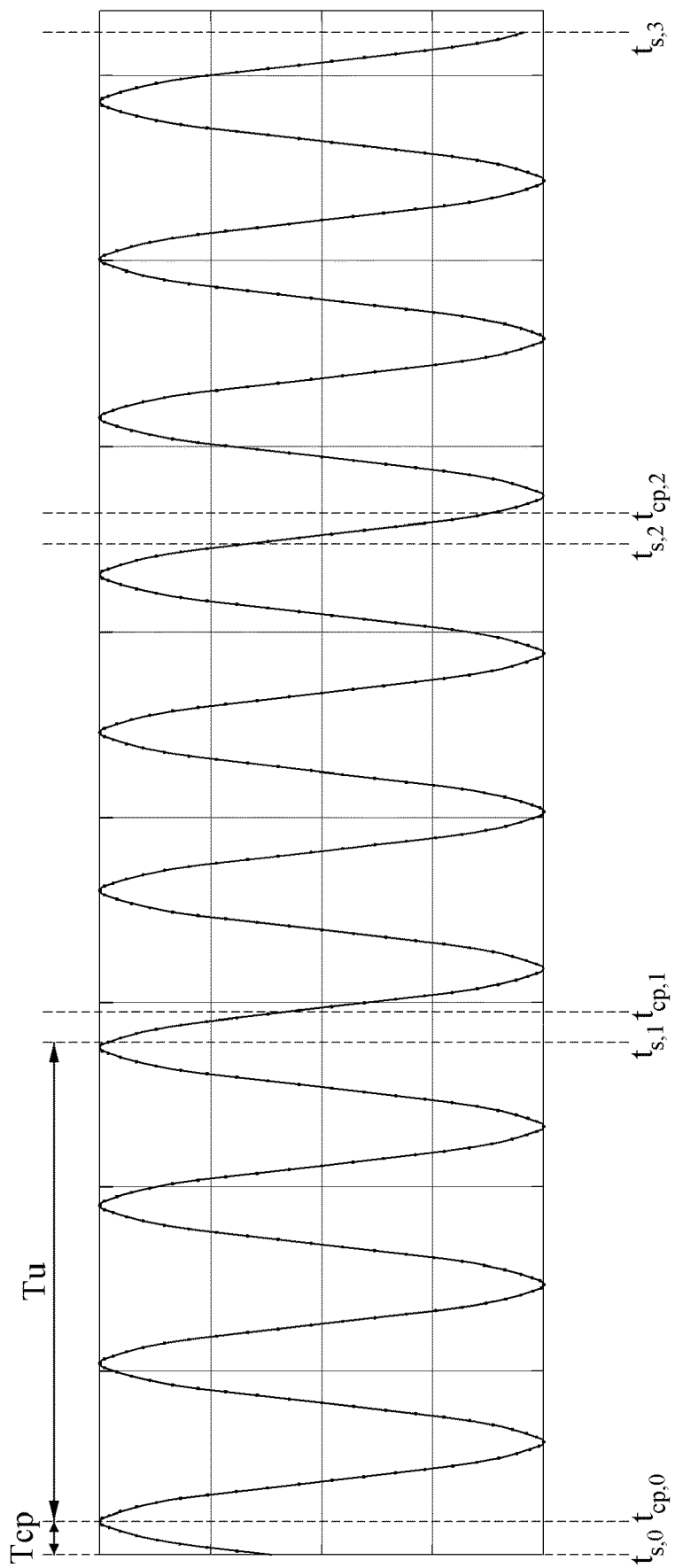
FIG. 7 illustrates an example of a waveform of a reference signal that is continuous in a boundary between symbols according to at least one example embodiment.

Referring to Equation 1, in the sequence of the reference signal, a sequence value corresponding to the ℓ-th symbol may correspond to a value that is phase-shifted by $$2\pi k \cdot \frac{T_{CP,\ell-1}}{T_u}$$

from a sequence value corresponding to the (ℓ-1)-th symbol. Through the aforementioned phase shift, the waveform of the reference signal may be continuous even in the boundary between symbols. For example, the waveform of the reference signal continuous in a plurality of symbol periods may be represented as FIG. 7.

Differently representing Equation 1, it may be expressed as Equation 2.

$$X_\ell[k] = X_0[k] \cdot \exp\left(2\pi jk \cdot \sum_{i=1}^{l} \frac{T_{CP,i-1}}{T_u}\right) \quad \text{[Equation 2]}$$

In Equation 2, $X_0[k]$ denotes a frequency domain complex exponentiation representing an initial phase and amplitude of a k-th subcarrier of an initial symbol (symbol index=0).

If the normal CP is applied in the LTE standard, the sequence of the reference signal may be represented as Equation 3.

$$X_{s,\ell}[k] = (-1)^{s \cdot k} \varphi_{init}^k \cdot \exp\left(2\pi jk \cdot \ell \cdot \frac{T_{cp}}{T_u}\right) \quad \text{[Equation 3]}$$

In Equation 3, $\varphi_{init}^k$ denotes a frequency domain complex exponentiation representing an initial phase and amplitude of a k-th subcarrier of an initial symbol of an initial slot. Also, s denotes a slot index, ℓ denotes a symbol index, and $X_{s,\ell}[k]$ denotes a frequency domain complex exponentiation representing an initial phase and amplitude of a k-th subcarrier of an ℓ-th symbol of an s-th slot. If k is an even number, $(-1)^{s \cdot k}$ is 1 at all times. Therefore, an initial phase of a k-th subcarrier of a start symbol of a slot may be the same regardless of a slot index. In contrast, if k is an odd number, $(-1)^{s \cdot k}$ is −1 for s=odd number and 1 for s=even number. Therefore, the initial phase of the k-th subcarrier of the start symbol of the slot may vary based on a slot index. If the symbol index ℓ is numbered for each slot, ℓ may be one of 0, 1, 2, . . . 6. Accordingly, $$P = \ell \text{ and } \frac{T_{cp}}{T_u} = 9/128.$$

When the same notation as the notation used in a previous equation is used in a following equation in describing the following equations, description related to the corresponding notation is omitted. If the normal CP is applied in the 5G NR standard, the sequence of the reference signal may be represented as Equation 4.

$$X_{s,\ell}[k] = (-1)^{s \cdot k \cdot \delta(\mu)} \varphi_{init}^k \cdot \exp\left(2\pi jk \cdot P \cdot \frac{T_{cp}}{T_u}\right), \quad \text{[Equation 4]}$$

$$P = \ell \bmod (7 \cdot 2^\mu), \mu = 0, 1, 2, 3 \ldots$$

In Equation 4, mod denotes a modulo function used to acquire a remainder. In the case of the normal CP of the LTE standard, numerology number μ=0 and accordingly, P and ℓ=0, . . . 6. Also, δ(μ) is a Dirac delta function that is defined as 1 only if μ=0. An index portion equation of −1 that determines a sign of a subcarrier, i.e., s·k·δ(μ), is defined if μ=0, that is, if a subcarrier spacing is 15 kHz. The index portion of −1 is 0 in other subcarrier spacings, that is, if μ>0. Therefore, start symbols of all of the subcarriers have a positive sign.

In the 5G NR standard, if the symbol index is numbered based on a subframe unit and, in this instance, if subcarrier spacing=15 kHz, a sequence of a reference signal may be represented as Equation 5.

$$X_\ell[k] = (-1)^{s \cdot k} \varphi_{init}^k \cdot \exp\left(j\frac{9}{64}kP\pi\right) s = \left[\frac{\ell}{7}\right], \quad \text{[Equation 5]}$$

$$P = \ell \bmod 7$$

With the assumption that the normal CP is applied, if the subcarrier spacing is 15 kHz or higher in the 5G NR standard, the sequence of the reference signal may be represented as Equation 6.

$$\begin{cases} X_\ell[k] = \varphi_{init}^k & l = 0 \text{ or } l = 7 \cdot 2^\mu \\ X_\ell[k] = \varphi_{init}^k \cdot \exp\left(j\frac{9}{64}k\ell\pi\right) & l \neq 0 \text{ and } l \neq 7 \cdot 2^\mu \end{cases} \quad \text{[Equation 6]}$$

If the extended CP is applied in the LTE standard and the 5G NR standard, the sequence of the reference signal may be represented as Equation 7.

$$X_{s,\ell}[k] = (-1)^{s \cdot k} \varphi_{init}^k \cdot \exp\left(2\pi jk \cdot \ell \cdot \frac{T_{cp}}{T_u}\right), \text{ in LTE} \quad \text{[Equation 7]}$$

$$X_{s,\ell}[k] = \varphi_{init}^k \cdot \exp\left(2\pi jk \cdot \ell \cdot \frac{T_{cp}}{T_u}\right) \text{ in 5G } NR$$

In Equation 7, in the LTE standard, ℓ denotes a symbol index and may be 0 . . . 5. Also, in the 5G NR standard, ℓ denotes the symbol index and may be 0 . . . 11.

If the symbol index is numbered for each subframe and the extended CP is applied, the sequence of the reference signal may be represented as Equation 8.

$$X_\ell[k] = (-1)^{s \cdot k} \varphi_{init}^k \cdot \exp\left(2\pi jk \cdot P \cdot \frac{T_{cp}}{T_u}\right), \quad \text{[Equation 8]}$$

$$s = \left[\frac{\ell}{6}\right], P = l \bmod 6 \text{ in LTE}$$

$$X_\ell[k] = \varphi_{init}^k \cdot \exp\left(2\pi jk \cdot P \cdot \frac{T_{cp}}{T_u}\right),$$

$$P = l \bmod 24 \text{ in 5G } NR$$

In Equation 8, ℓ denotes a symbol index and may be 0 . . . 5. If 60 kHz subcarrier spacing is applied, P may be 0 . . . 23 in a symbol of the extended CP and $T_{cp}/T_u=\frac{1}{4}$.

Referring again to FIGS. 2 and 4, in operation S110, the UE 200 may receive the reference signal. Since positions of patch antennas differ from each other, a travel distance of a signal transmitted from each of the patch antennas may be different. For example, the travel distance of the reference signal transmitted from the patch antenna present in the first column may be represented as $r_1$ and the travel distance of the reference signal transmitted from the patch antenna present in the second column may be represented as $r_2$. Since the travel distance of the reference signal is different, an arrival and propagation delay time of the reference signal may also vary. For example, the propagation delay time of the reference signal transmitted from the patch antenna of the first column may be represented as $\tau_1$, and the propagation delay time of the reference signal transmitted from the patch antenna of the second column may be represented as $\tau_2$.

Hereinafter, description is made by formulating the reference signal transmitted from the base station 100 in operation S100 and the reference signal received at the UE 200 in operation S110. The following equations are simply provided to help the understanding of example embodiments and may be modified by those skilled in the art without departing from the scope of the disclosure.

A baseband of a reference signal transmitted from the base station 100 at a time t may be represented as Equation 9.

$$B_a(t) = \sum_{q \in U} A_q e^{i\omega_q t} \qquad \text{[Equation 9]}$$

In Equation 9, $B_a(t)$ denotes the reference signal transmitted in the baseband at the time t, $A_q$ denotes an amplitude and initial phase component of a subcarrier signal having an angular frequency $\omega_q$, and U denotes a set of indices of subcarriers included in a subcarrier group. The base station 100 may modulate a baseband signal of the reference signal to a passband signal using a carrier signal having an angular frequency $\omega_c$ and may transmit the modulated passband signal.

The reference signal modulated to the passband signal may be represented as Equation 10.

$$S_a(t) = B_a(t) \cdot e^{i\omega_c t} = \sum_{q \in U} A_q e^{i(\omega_c + \omega_q)t} \qquad \text{[Equation 10]}$$

In Equation 10, $S_a(t)$ denotes the reference signal modulated to the passband signal, and $\omega_c$ denotes the angular frequency of the carrier. The time t may refer to a time within a time interval in which the reference signal is transmitted. For example, if the reference signal continues during n symbol periods, t may be one of values between 0 and $n \times (T_u + T_{CP})$.

Since positions of patch antennas that transmit the respective subcarriers differ from each other, a propagation delay time may be different for each subcarrier component. For example, when a propagation delay time of a $q^{th}$ subcarrier component among reference signals is represented as $\tau_q$, the reference signal $S'_a(t)$ received at the UE 200 may be represented as Equation 11.

$$S'_a(t) = \sum_{q \in U} A_q e^{i(\omega_c + \omega_q)(t - \tau_q)} = e^{i\omega_c t} \sum_{q \in U} A_q e^{i\omega_q t} e^{-i(\omega_c + \omega_q)\tau_q} \qquad \text{[Equation 11]}$$

The UE 200 may demodulate, to the baseband signal, the passband reference signal received at the UE 200 in Equation 11. The UE 200 may multiply the passband signal received at the UE 200 by a factor for eliminating the angular frequency component $\omega_c$ of the carrier. This process may be represented as Equation 12.

$$y_a(t) = \qquad \text{[Equation 12]}$$
$$e^{-i\omega_c(t-\epsilon)} \cdot S'_a(t) = e^{-i\omega_c(t-\epsilon)} \cdot e^{i\omega_c t} \sum_{q \in U} A_q e^{i\omega_q t} e^{-i(\omega_c + \omega_q)\tau_q} =$$
$$e^{i\omega_c \epsilon} \cdot \sum_{q \in U} A_q e^{i\omega_q t} e^{-i(\omega_c + \omega_q)\tau_q}$$

In Equation 12, $y_a(t)$ denotes a result of transforming the reference signal received at the UE 200 to the baseband signal, and $\epsilon$ denotes a local clock error that occurs due to mismatch between a clock of a receiving (Rx) UE and a clock of a transmitting (Tx) base station.

Referring to Equation 12, although $e^{i\omega_c t}$ is absent in $y_a(t)$, a phase shift component $e^{i\omega_c \epsilon}$ may remain due to the local clock error $\epsilon$. Although it is difficult to know a value of the phase shift component $e^{i\omega_c \epsilon}$ in detail, a phase shift amount may be proportional to the angular frequency $\omega_c$ of the carrier. That is, a result of demodulating the reference signal received at the UE 200 may include a phase component that depends on the angular frequency $\omega_c$ of the carrier. Therefore, phase information used to calculate a difference between travel distances of the respective subcarrier components of the reference signals includes a term that depends on the angular frequency $\omega_c$ of the carrier and an amplitude thereof may be amplified. Accordingly, an angle information acquisition performance of the UE 200 may be improved.

The UE 200 may extract a sample vector from the received reference signal. The UE 200 may acquire the sample vector by transforming reference signals received at a plurality of points in times to baseband signals. For example, the UE 200 may extract the sample vector by transforming reference signals received at N points in times to baseband signals. In a typical OFDM system, a value of N may be determined based on a size of fast Fourier transform (FFT) window. The sample vector may be represented as Equation 13.

$$Y_a(t) = \begin{bmatrix} y_a(t) \\ y_a(t-1) \\ \vdots \\ y_a(t-N+1) \end{bmatrix} \qquad \text{[Equation 13]}$$

In Equation 13, $Y_a(t)$ denotes a sample vector that includes samples of the reference signal received at the UE 200 at N sample times. If the waveform of the reference signal is discontinuous in a plurality of symbol periods, the UE 200 may not readily change t of Equation 13 since a time interval in which the following FFT operation is applicable is limited. In contrast, if the waveform of the reference signal is continuous in the plurality of symbol periods, the UE 200 may readily acquire a plurality of sample vectors by changing t of Equation 13 without considering the boundary between symbols.

In operation S120, the UE 200 may calculate a phase vector from the sample vector of the reference signal. Hereinafter, a process of calculating, by the UE 200, the phase vector of the reference signal is described.

Conjugated complex exponentiations of subcarriers corresponding to N sample times may be represented as a vector of Equation 14.

$$DFT_k(t-\epsilon)=[e^{-i\omega_k(t-\epsilon)}e^{-i\omega_k(t-1-\epsilon)}e^{-i\omega_k(t-\epsilon)}$$
$$e^{-i\omega_k(t-2-\epsilon)} \ldots e^{-i\omega_k(t-N+1-\epsilon)}]$$ [Equation 14]

In Equation 14, $DFT_k(t-\epsilon)$ denotes a discrete Fourier transform (DFT) coefficient vector used for an FFT operation of a kth subcarrier having an angular frequency $\omega_k$, and $\epsilon$ denotes a local clock error occurring due to mismatch between a clock of the UE 200 and a clock of the base station 100. Components of the DFT coefficient vector may rotate on the complex plane according to an increase in $t-\epsilon$.

The UE 200 may perform an inner product on the sample vector represented in Equation 13 and the DFT coefficient vector represented in Equation 14. The UE 200 may extract a phase of each of subcarrier components by performing the inner product operation. The UE 200 may calculate a sum of result values acquired by multiplying each of components (conjugate complex exponential values) of the DFT coefficient vector by each of components of the sample vector through the inner product operation.

The aforementioned operation process may be represented as Equation 15.

$$Y_k = DFT_k(t-\epsilon) \cdot \begin{bmatrix} y_a(t) \\ y_a(t-1) \\ \vdots \\ y_a(t-N+1) \end{bmatrix} =$$ [Equation 15]

$$\sum_{n=0}^{N-1} y_a(t-n)e^{-i\omega_k(t-n-\epsilon)} = N \cdot A_k e^{-i(\omega_c+\omega_k)(\tau_k-\epsilon)} + \sigma_a$$

$$\sigma_a = \sum_{n=0}^{N-1} \sum_{q\in U, q\neq k} A_q e^{i((\omega_q-\omega_k)(t-n)+(\omega_c+\omega_k)\epsilon-(\omega_c+\omega_q)\tau_q)} \approx 0$$

In Equation 15, $y_a(t)$ denotes data acquired by transforming the reference signal received at the UE 200 at the time t to the baseband signal, and N denotes a number of components of the sample vector. N may correspond to a size of a summation time interval in the inner product operation. In the typical OFDM system, N may be determined based on a size of an FFT window.

Referring to Equation 15, an inner product result of $DFT_k(t-\epsilon)$ and $Y_a(t)$ may be represented as a sum of error component $\sigma_a$ and $N \cdot A_k e^{-i(\omega_c+\omega_k)\tau_k-\epsilon)}$ that is independent at the time t. Here, $\sigma_a$ may degrade positioning precision by acting as an interference component caused by noise and other orthogonal subcarrier components. The UE 200 may ignore $\sigma_a$ through convergence thereof to 0 by averaging values calculated by collecting a plurality of samples. To this end, the UE 200 may acquire a plurality of sample vectors by shifting a start point t of a time interval of the sample vector. If the waveform of the reference signal is continuous in the plurality of symbol periods, the UE 200 may easily acquire the plurality of sample vectors. Here, $\epsilon$ denotes the local clock error occurring due to mismatch between the clock of the UE 200 and the clock of the base station 100.

In Equation 15, a phase of component $N \cdot A_k e^{-i(\omega_c+\omega_k)\tau_k-\epsilon)}$ corresponding to the $k^{th}$ subcarrier may include a factor proportional to a propagation delay time $\tau_k$ between the base station 100 and the UE 200. The factor may include a multiplication of $\tau_k$ and $\omega_c$. That is, in the inner product operation result of the UE 200, a phase shift amount of an element corresponding to each angular frequency component of a subcarrier may depend on the angular frequency of the carrier.

In the aforementioned description, only the $k^{th}$ subcarrier signal having the angular frequency $\omega_k$ is considered. In the case of considering the entire subcarrier group of the reference signal, Equation 15 may be generalized to Equation 16.

$$\mathbb{Y} = \begin{bmatrix} Y_1 \\ Y_2 \\ \vdots \\ Y_m \end{bmatrix} = \begin{bmatrix} DFT_1(t-\epsilon) \\ DFT_2(t-\epsilon) \\ \vdots \\ DFT_m(t-\epsilon) \end{bmatrix} \cdot \begin{bmatrix} y_a(t) \\ y_a(t-1) \\ \vdots \\ y_a(t-N+1) \end{bmatrix} =$$ [Equation 16]

$$N \cdot \begin{bmatrix} A_1 e^{-i(\omega_c+\omega_{u1})(\tau_1-\epsilon)} \\ A_2 e^{-i(\omega_c+\omega_{u2})(\tau_2-\epsilon)} \\ \vdots \\ A_m e^{-i(\omega_c+\omega_{um})(\tau_m-\epsilon)} \end{bmatrix} + \sigma_A$$

In Equation 16, $Y_1, Y_2, \ldots Y_m$ represent an inner product result between the sample vector and the DFT coefficient vector acquired by Equation 15. $\mathbb{Y}$ denotes a vector that includes $Y_1, Y_2, \ldots Y_m$. For example, $\mathbb{Y}$ may be referred to as a phase vector and $\sigma_A$ denotes an error vector.

The UE 200 may acquire a plurality of phase vectors by shifting the start point t of the time interval. Since the reference signal is continuous in the plurality of symbol periods, a process of acquiring, by the UE 200, phase vectors may be facilitated.

Referring to Equation 16, the phase vector $\mathbb{Y}$ may depend on the local clock error $\epsilon$. To calculate a parameter independent from the local clock error, the UE 200 may extract a first sub-phase vector and a second sub-phase vector from the phase vector $\mathbb{Y}$.

In operation S130 of FIG. 4, the UE 200 may extract the first sub-phase vector and the second sub-phase vector. For example, the UE 200 may determine the first sub-phase vector by extracting a desired number of components having a relatively low angular frequency index from the phase vector $\mathbb{Y}$ of Equation 16. The UE 200 may determine the second sub-phase vector by extracting a desired number of components having a relatively high angular frequency index from the phase vector $\mathbb{Y}$ of Equation 16. For example, the UE 200 may extract a first sub-phase vector $\mathbb{Y}_A$ having m−1 components with a relatively low angular frequency index from the phase vector $\mathbb{Y}$. The UE 200 may extract a second sub-phase vector $\mathbb{Y}_B$ having m−1 components with a relatively high angular frequency index from the phase vector $\mathbb{Y}$. The UE 200 may calculate a conjugate product of the first sub-phase vector $\mathbb{Y}_A$ and the second sub-phase vector $\mathbb{Y}_B$. The conjugate product of the first sub-phase vector $\mathbb{Y}_A$ and the second sub-phase vector $\mathbb{Y}_B$ may be represented as Equation 17.

[Equation 17]

$$\mathbb{Y}_A \mathbb{Y}_B^* =$$

$$N^2 \cdot \begin{bmatrix} A_1 e^{-i(\omega_c+\omega_{u1})(\tau_1-\epsilon)} \\ A_2 e^{-i(\omega_c+\omega_{u2})(\tau_2-\epsilon)} \\ \vdots \\ A_m e^{-i(\omega_c+\omega_{um-1})(\tau_{m-1}-\epsilon)} \end{bmatrix} \cdot \begin{bmatrix} A_2^* e^{i(\omega_c+\omega_{u2})(\tau_2-\epsilon)} \\ A_3^* e^{i(\omega_c+\omega_{u3})(\tau_3-\epsilon)} \\ \vdots \\ A_m^* e^{i(\omega_c+\omega_{um})(\tau_m-\epsilon)} \end{bmatrix} =$$

-continued $$N^2 \cdot \begin{bmatrix} A_1 A_2^* e^{i(\omega_c + \omega_{u2} - \omega_{u1})(\tau_2 - \tau_1)} \\ A_2 A_3^* e^{i(\omega_c + \omega_{u3} - \omega_{u2})(\tau_3 - \tau_2)} \\ \vdots \\ A_{m-1} A_m^* e^{i(\omega_c + \omega_{um} - \omega_{um-1})(\tau_m - \tau_{m-1})} \end{bmatrix}$$

As described above, if subcarriers are provided at equal intervals in the frequency domain, $\omega_{u2} - \omega_{u1} = \omega_{u3} - \omega_{u2} = \cdots \omega_{um} - \omega_{um-1}$ may be satisfied. Therefore, with the assumption of $\omega_{um} - \omega_{um-1} = \omega_u$ for any m, Equation 17 may be represented as Equation 18.

$$Y_A Y_B^* = N^2 \cdot \begin{bmatrix} A_1 A_2^* e^{i(\omega_c + \omega_u)(\tau_2 - \tau_1)} \\ A_2 A_3^* e^{i(\omega_c + \omega_u)(\tau_3 - \tau_2)} \\ \vdots \\ A_{m-1} A_m^* e^{i(\omega_c + \omega_u)(\tau_m - \tau_{m-1})} \end{bmatrix} \quad \text{[Equation 18]}$$

The UE 200 may calculate a phase angle of each of conjugate components of the first sub-phase vector $Y_A$ and the second sub-phase vector $Y_B$. For example, the UE 200 may calculate the phase angle of each of the conjugate components according to Equation 19.

$$\text{Angle}(Y_A Y_B^*) = \begin{bmatrix} (\omega_c + \omega_u)(\tau_2 - \tau_1) \\ (\omega_c + \omega_u)(\tau_3 - \tau_2) \\ \vdots \\ (\omega_c + \omega_u)(\tau_m - \tau_{m-1}) \end{bmatrix} \approx \omega_c(\tau_2 - \tau_1) \quad \text{[Equation 19]}$$

Referring to Equation 19, the angular frequency $\omega_c$ of the carrier is generally much greater than a difference $\omega_u$ between angular frequencies of adjacent subcarriers. Therefore, Equation 19 may be established by approximating $\omega_c + \omega_u$ to $\omega_c$. Also, in Equation 19, since Angle($Y_A Y_B^+$) does not depend on the local clock error $\epsilon$, the UE 200 may calculate Angle($Y_A Y_B^+$) without knowing information about the local clock error $\epsilon$.

In Equation 19, for example, a difference between the angular frequency index of the first sub-phase vector $Y_A$ and the angular frequency index of the second sub-phase vector $Y_B$ is 1. However, it is provided as an example only. For example, a difference between the angular frequency index of components of $Y_A$ and the angular frequency index of components of $Y_B$ may be 2 or more. Also, in Equation 19, for example, each of $Y_A$ and $Y_B$ includes m−1 components. However, it is provided as an example only. Each of $Y_A$ and $Y_B$ may include a smaller number of components than m−1. For example, the UE 200 may extract information about a value of phase angle $\omega_c(\tau_2 - \tau_1)$ only with a conjugate product between a first component (e.g., $A_1 e^{-(\omega_c + \omega_{u1})(\tau_1 - \epsilon)}$) having a low angular frequency index and a second component (e.g., $A_2 e^{-(\omega_c + \omega_{u2})(\tau_2 - \epsilon)}$) having a high angular frequency index in the phase vector $Y$.

Using the aforementioned Equation 9 to Equation 19, the UE 200 may acquire information about a difference in propagation delay time between signals transmitted from the patch antennas.

In operation S140 of FIG. 4, the UE 200 may calculate an AoD of the reference signal received at the UE 200 from Angle($Y_A Y_B^+$) of Equation 19.

Figure 8:
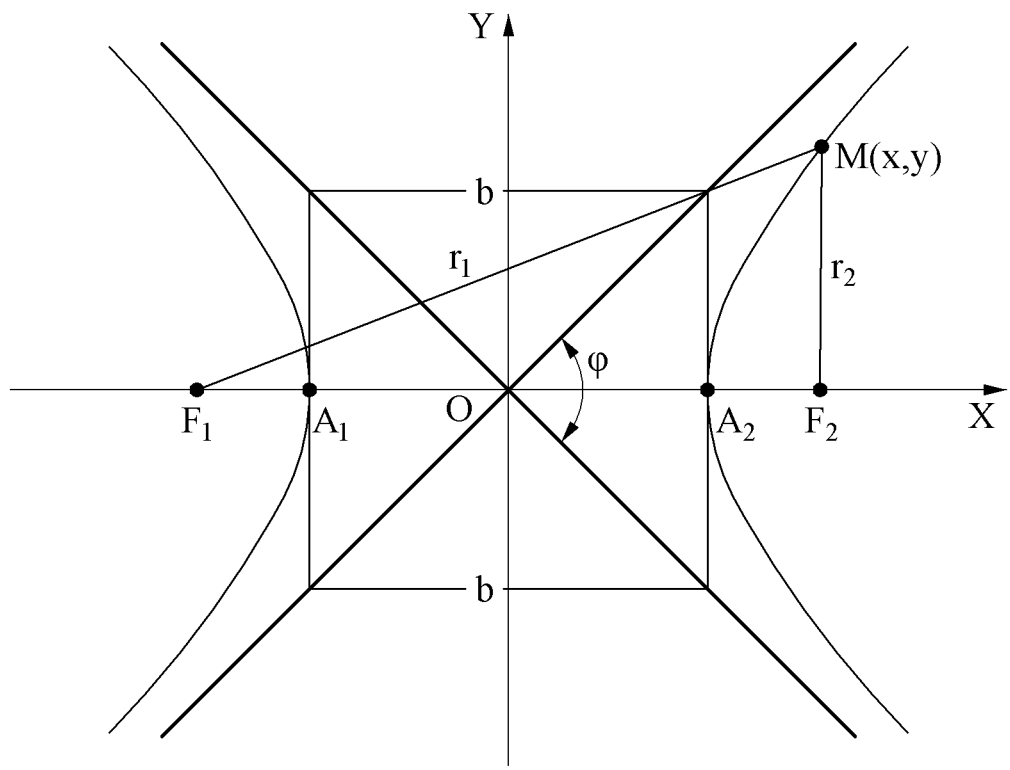
FIG. 8 illustrates an example of hyperbola according to at least one example embodiment.

FIG. 8 illustrates an example of hyperbola according to at least one example embodiment.

Referring to FIG. 8, if first focal coordinates $F_1(+F, 0)$ of the hyperbola correspond to coordinates of a first patch antenna, second focal coordinates $F_2(-F, 0)$ of the hyperbola correspond to coordinates of a second patch antenna, and M(x,y) correspond to coordinates of the UE 200, an travel distance $r_1$ of the signal transmitted from the first patch antenna and an travel distance $r_2$ of the signal transmitted from the second patch antenna may satisfy Equation 20.

$$r_1 = \sqrt{(x+F)^2 + y^2}$$

$$r_2 = \sqrt{(x+F)^2 + y^2} \quad \text{[Equation 20]}$$

Also, $r_1$ and $r_2$ may be represented as Equation 21 and Equation 22.

$$|r_1 - r_2| = 2a \quad \text{[Equation 21]}$$

$$\frac{x^2}{a^2} - \frac{y^2}{b^2} = 1 \quad \text{[Equation 22]}$$

Parameters a and b of Equation 21 and Equation 22 may be represented as Equation 23.

$$a^2 + b^2 = F^2 \quad \text{[Equation 23]}$$

Here, considering that a distance between patch antennas is generally a half of a carrier wavelength, that is, 0.5 $\lambda_c$, Equation 21 may be represented as Equation 24.

$$|r_1 - r_2| = \quad \text{[Equation 24]}$$

$$2a = \frac{\lambda_c}{2\pi} \text{angle}(Y_A Y_B^*) = \frac{2F}{\pi} \text{angle}(Y_A Y_B^*), \because F = \frac{\lambda_c}{4}$$

Equation 25 may be derived from Equation 24.

$$\frac{a}{F} = \frac{\text{angle}(Y_A Y_B^*)}{\pi} \quad \text{[Equation 25]}$$

In general, a distance between the UE 200 and the base station 100 may be much greater than the distance between the patch antennas. Also, the hyperbola may converge to an asymptote according to an increase in values of x and y. Also, the asymptote of the hyperbola may be represented as $$y = \frac{b}{a} x.$$

Therefore, Equation 26 may be derived.

$$\frac{y}{x} = \frac{b}{a} = \frac{\sqrt{F^2 - a^2}}{a} = \sqrt{\left(\frac{F}{a}\right)^2 - 1} \quad \text{[Equation 26]}$$

In Equation 26, F/a may be represented as Equation 27.

$$\left(\frac{F}{a}\right)^2 = \left(\frac{y}{x}\right)^2 + 1 = \frac{x^2 + y^2}{x^2} \quad \text{[Equation 27]}$$

Using Equation 25 and Equation 27, the AoD of the reference signal may be represented as Equation 28.

$$\frac{a}{F} = \frac{\text{angle}(\Upsilon_A \Upsilon_B^*)}{\pi} = \frac{x}{\sqrt{x^2+y^2}} = \cos\phi \quad \text{[Equation 28]}$$

In Equation 28, ϕ denotes the AoD of the reference signal. Equation 28 may be further simplified as Equation 29.

$$\phi = \cos^{-1}\left(\frac{\text{angle}(\Upsilon_A \Upsilon_B^*)}{\pi}\right) \quad \text{[Equation 29]}$$

Referring to Equation 29, the UE 200 may calculate the AoD of the reference signal from angle($\Upsilon_A \Upsilon_B^*$).

Referring again to FIG. 4, in operation S200, the UE 200 may transfer AoD information of the reference signal to the base station 100.

In operation S210, the base station 100 may determine a scanning direction of a beam for the UE based on the AoD of the reference signal. The base station 100 may select a beam most excellently receivable at the UE 200 based on the scanning direction of the beam for the UE 200 and may transmit the selected beam. Through this, the base station 100 may select the beam to be transmitted to the UE 200 without using the beam sweeping procedure.

Although an example embodiment in which the UE 200 calculates the AoD of the reference signal is described, it is provided as an example only. For example, the UE 200 may calculate the AoD of the reference signal by transferring reception information of the reference signal represented as Equation 11 or Equation 12 to the base station 100 such that the base station 100 may perform operations S110 to S140 of FIG. 4.

A method of acquiring angle information of a reference signal and a method of determining a scanning direction of a beam to be transmitted to a UE based on the angle information of the reference signal according to example embodiments are described with reference to FIGS. 1 to 8. According to at least one example embodiment, a UE may easily calculate a difference in travel distance or a difference in propagation delay time between signals received from different patch antennas. According to at least one example embodiment, a UE may easily calculate an AoD of a reference signal from phase information corresponding to a difference in travel distance or a difference in propagation delay time between signals received from different patch antenna. According to at least one example embodiment, a base station may omit a beam sweeping procedure based on information about an AoD of a reference signal, thereby preventing the redundant use of wireless resources.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processors having an internal and/or external memory, for example, a microprocessor, a controller such as a microcontroller and an embedded microcontroller, a microcomputer, an arithmetic logic unit (ALU), and a digital signal processor such as a programmable digital signal processor or other programmable devices. In addition, or, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A method of acquiring angle information of a reference signal performed by a user equipment (UE), the method comprising:
   receiving a reference signal from a base station comprising a plurality of patch antennas;
   acquiring phase information depending on a carrier frequency of the reference signal based on received data of the reference signal measured at a plurality of sample times; and
   calculating an angle of departure (AoD) of the reference signal based on the phase information depending on the carrier frequency and a distance between a first patch antenna and a second patch antenna of the plurality of patch antennas,
   wherein the plurality of patch antennas comprises the first patch antenna configured to transmit a first subcarrier and the second patch antenna configured to transmit a second subcarrier different from the first subcarrier, and
   the phase information depends on a sum of the carrier frequency and a difference between the first subcarrier and the second subcarrier.

2. The method of claim 1, wherein a waveform of the reference signal is configured to be continuous in a time interval greater than a size of an orthogonal frequency division multiplexing (OFDM) symbol.

3. The method of claim 1, wherein the plurality of patch antennas is configured to transmit subcarriers comprised in a predetermined subcarrier group and the subcarriers are provided at equal intervals in a frequency domain.

4. The method of claim 1, wherein the acquiring of the phase information comprises:
   acquiring a sample vector based on the received data of the reference signal;
   calculating a phase vector by performing an inner product on a discrete Fourier transform (DFT) coefficient vector for a DFT operation with respect to the sample vector;
   extracting a first sub-phase vector and a second sub-phase vector from the phase vector; and
   extracting the phase information from a conjugate product from the first sub-phase vector and the second sub-phase vector.

5. The method of claim 4, wherein the conjugate product of the first sub-phase vector and the second sub-phase vector comprises a conjugate product between a first component of the phase vector and a second component having an angular frequency index different from an angular frequency of the first component.

6. The method of claim 4, wherein the conjugate product of the first sub-phase vector and the second sub-phase vector is independent from a local clock error between the UE and the base station.

7. A user equipment (UE) comprising:
   a communicator; and
   a processor,
   wherein the processor is configured to perform a process of receiving a reference signal from a base station comprising a plurality of patch antennas, a process of acquiring phase information depending on a carrier frequency of the reference signal based on received data of the reference signal measured at a plurality of sample times, and a process of calculating an angle of departure (AoD) of the reference signal based on the phase information depending on the carrier frequency and a distance between a first patch antenna and a second patch antenna of the plurality of patch antennas,
   wherein the plurality of patch antennas comprises the first patch antenna configured to transmit a first subcarrier and the second patch antenna configured to transmit a second subcarrier different from the first subcarrier, and
   the phase information depends on a sum of the carrier frequency and a difference between the first subcarrier and the second subcarrier.

8. The UE of claim 7, wherein a waveform of the reference signal is configured to be continuous in a time interval greater than a size of an orthogonal frequency division multiplexing (OFDM) symbol.

9. The UE of claim 7, wherein the process of acquiring the phase information depending on the carrier frequency comprises:
   a process of acquiring a sample vector based on the received data of the reference signal;

a process of calculating a phase vector by performing an inner product on a discrete Fourier transform (DFT) coefficient vector for a DFT operation with respect to the sample vector;

a process of extracting a first sub-phase vector and a second sub-phase vector from the phase vector; and a process of extracting the phase information from a conjugate product from the first sub-phase vector and the second sub-phase vector.

10. The UE of claim 9, wherein the conjugate product of the first sub-phase vector and the second sub-phase vector comprises a conjugate product between a first component of the phase vector and a second component having an angular frequency index different from an angular frequency of the first component.

11. The UE of claim 9, wherein the conjugate product of the first sub-phase vector and the second sub-phase vector is independent from a local clock error between the UE and the base station.

12. A beam selection method performed by a base station, the beam selection method comprising:

setting a subcarrier group allocated to a plurality of patch antennas;

determining a reference signal sequence;

transmitting a reference signal based on the subcarrier group and the reference signal sequence;

acquiring information about an angle of departure (AoD) of the reference signal from a user equipment (UE); and determining a beam to be transmitted to the UE based on information about the AoD of the reference signal, wherein the AoD is determined based on phase information depending on a carrier frequency of the reference signal and a distance between a first patch antenna and a second patch antenna of the plurality of patch antennas, wherein the plurality of patch antennas comprises the first patch antenna configured to transmit a first subcarrier and the second patch antenna configured to transmit a second subcarrier different from the first subcarrier, and the phase information depends on a sum of the carrier frequency and a difference between the first subcarrier and the second subcarrier.

13. The beam selection method of claim 12, wherein the reference signal sequence is configured such that a waveform of the reference signal is configured to be continuous in a time interval greater than a size of an orthogonal frequency division multiplexing (OFDM) symbol.

14. The beam selection method of claim 12, wherein subcarriers comprised in the subcarrier group are provided at equal intervals in a frequency domain.

* * * * *